L. PROKOPCZUK.
DRAFT EQUALIZER.
APPLICATION FILED JULY 20, 1918.
1,297,592.
Patented Mar. 18, 1919.
2 SHEETS—SHEET 1.
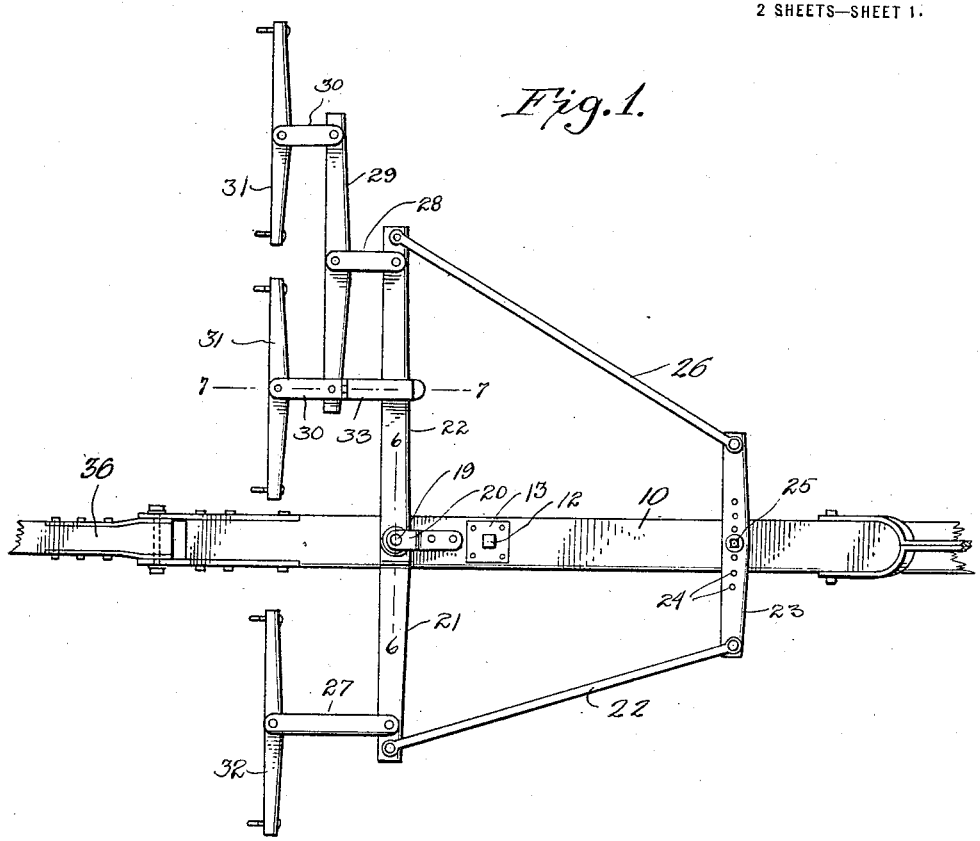
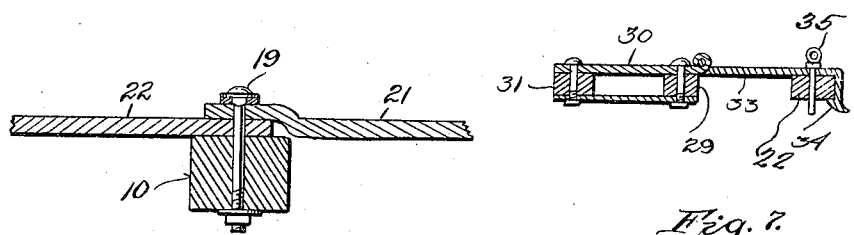
Inventor
Lukasz Prokopczuk
Witnesses
By R. Morgan Elliott & Co.
Attorneys

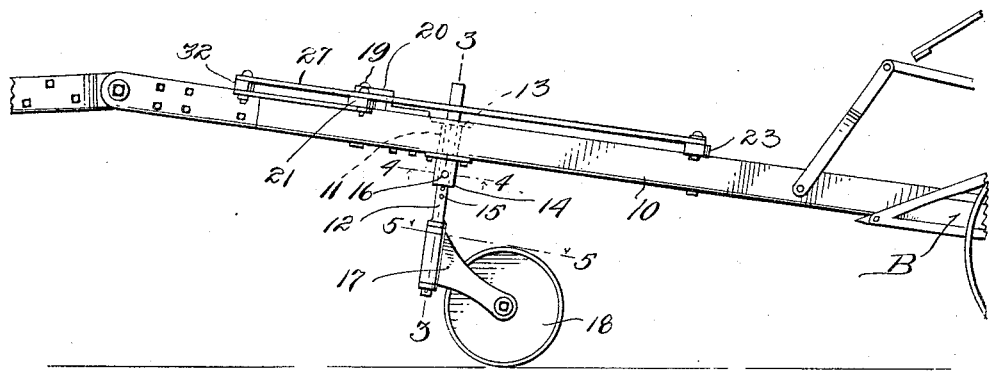
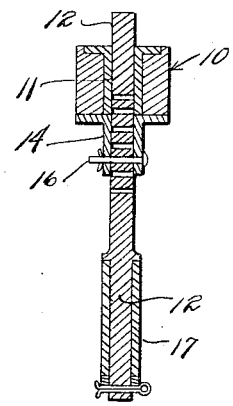
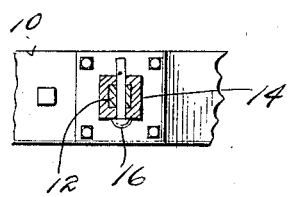
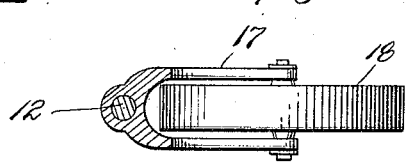

UNITED STATES PATENT OFFICE.

LUKASZ PROKOPCZUK, OF ARRAN, SASKATCHEWAN, CANADA.

DRAFT-EQUALIZER.

1,297,592.  Specification of Letters Patent.  Patented Mar. 18, 1919.

Application filed July 20, 1918. Serial No. 245,834.

*To all whom it may concern:*

Be it known that I, LUKASZ PROKOPCZUK, a subject of the Emperor of Austria, residing at Arran, in the Province of Saskatchewan and Dominion of Canada, have invented certain new and useful Improvements in Draft-Equalizers, of which the following is a specification.

This invention relates to agricultural implements and has special reference to a draft equalizer for use in connection with binders and other implements of that class.

One important object of the invention is to provide an improved general construction of devices of this character.

A second important object of the invention is to provide an improved device of this character which can be readily changed from a two-horse equalizer to a three-horse equalizer or reversely from a three-horse to a two-horse equalizer without making it necessary to remove or add any parts.

With the above and other objects in view, as will be hereinafter apparent the invention consists in general of certain novel details of construction and combinations of parts hereinafter fully described, illustrated in the accompanying drawings, and specifically claimed.

In the accompanying drawings, like characters of reference indicate like parts in the several views, and:—

Figure 1 is a plan view of part of a binder showing the equalizer in position.

Fig. 2 is a side elevation thereof.

Fig. 3 is an enlarged section on the line 3—3 of Fig. 2.

Fig. 4 is an enlarged section on the line 4—4 of Fig. 2.

Fig. 5 is an enlarged section on the line 5—5 of Fig. 2.

Fig. 6 is an enlarged section on the line 6—6 of Fig. 1.

Fig. 7 is an enlarged section on the line 7—7 of Fig. 1.

In the embodiment of the invention herein illustrated the same has been shown as connected to a binder, the forward portion of which is indicated at B.

This binder has a forwardly extending draft beam 10 having an angular opening 11 intermediate its ends and through this opening extends a standard 12 which is also angular to fit the opening. On top of the beam 10 is provided a wear plate 13 and beneath the beam is a guide casting 14 through which the standard passes. Passing through suitable openings in the casting 14 and through one of a series of spaced openings 15 in the standard is a pin 16. By means of this pin the position of the standard vertically with relation to the beam may be adjusted. Swiveled on the lower end of the standard 12 is a fork 17 wherein is journaled a caster wheel 18. By means of this construction the height of the front end of the beam 10 may be regulated.

Adjacent the forward end of the beam is a pivot pin 19 suitably braced by a hammer strap 20 and on this pin are pivoted the inner ends of arms 21 and 22, the latter being considerably longer than the arm 21.

At 23 is a lever which is provided with a series of spaced vertical openings 24 and this lever is held in adjusted position on the beam 10 by means of a pin or bolt 25 passing through one of the openings 24 and a suitable opening in said beam. It will be observed that, by the proper selection of an opening 24 through which passes the pin 25 the ratio of the lengths of the lever arms may be varied at will.

The outer ends of the arms 21 and 22 are connected to the ends of the lever 23 by links 26.

Adjacent the outer ends of the arms 21 and 22 are pivoted pairs of links 27 and 28 respectively. Pivoted to the forward ends of the links 28 is a double tree 29 the ends of which carry pivoted links 30 which extend forwardly and have swingletrees 31 pivotally connected thereto. Pivotally connected to the forward ends of the links 27 is a swingletree 32 and it will be noted that the links 27 are long enough to bring the swingletree 32 into alinement with the swingletrees 31 when the arms 21 and 22 are alined as in Fig. 1.

Now, it will be observed that, if the device is used as a two-horse equalizer there will be no horse hitched to the outer swingletree 31. If no means is taken to prevent such action the pull of the horse on the inner swingletree 31, under these conditions swings the double tree around. In order to prevent such swinging of the doubletree one of the inner links 30 has hinged thereto a latch hook 33 to extend down behind the arm 22 and provided on its extremity with a barb 34 engaging beneath the arm 22 and by means of which the hook is kept from springing up. In order to prevent this barb from being disengaged from beneath the arm a pin 35 is provided which passes vertically through the shank of the hook and said arm.

By means of this construction it will be seen that the lever 23 may be adjusted for different pulls on the ends of the arms 21 and 22 and that, at any time, the horse may be detached from the outer swingletree 31 and the hook engaged with the arm 22 to convert the device from a three-horse equalizer to a two-horse equalizer.

To the forward end of the beam 10 is pivoted a tongue 36 arranged to swing vertically so that no matter how the front end of the beam 10 may be adjusted the tongue can always be arranged in proper position for the attachment of the horses' collars.

There has thus been provided a simple and efficient device of the kind described and for the purpose specified.

It is obvious that many minor changes may be made in the form and construction of the invention without departing from the material principles thereof. It is not therefore desired to confine the invention to the exact form herein shown and described but it is wished to include all such as properly come within the scope claimed.

Having thus described the invention, what is claimed as new, is:—

In combination, a draft beam, a pair of arms having their inner ends pivotally connected to the draft beam, an equalizer lever, means to adjustably connect the equalizer lever to the draft beam, links connecting the ends of said lever with the outer ends of said arms, a swingletree linked to the outer end of one arm, a double tree linked to the outer end of the other arm, swingletrees linked to the ends of the double tree, a hook having vertically swinging connection with the inner end of the double tree and engageable behind the arm to which the doubletree is linked, a barb on the lower end of the hook engageable beneath said arm, and a removable pin passing through the shank of the hook and said arm to hold the barb from disengagement with said arm.

In testimony whereof I affix my signature.

LUKASZ PROKOPCZUK.

Copies of this patent may be obtained for five cents each, by addressing the "Commissioner of Patents, Washington, D. C."